United States Patent [19]

Cleer, Jr.

[11] 4,131,231

[45] * Dec. 26, 1978

[54] FIREPLACE HEATING SYSTEM

[75] Inventor: Clarence W. Cleer, Jr., Kane, Pa.

[73] Assignee: Ridgway Steel Fabricators, Inc., Ridgway, Pa.

[*] Notice: The portion of the term of this patent subsequent to May 18, 1993, has been disclaimed.

[21] Appl. No.: 764,904

[22] Filed: Feb. 1, 1977

Related U.S. Application Data

[60] Division of Ser. No. 687,631, May 18, 1976, Pat. No. 4,025,043, which is a continuation-in-part of Ser. No. 495,107, Aug. 5, 1974, Pat. No. 3,958,755.

[51] Int. Cl.² .............................................. F24D 3/00
[52] U.S. Cl. .................................. 237/8 R; 237/1 A; 237/19; 237/61; 126/16; 126/132; 126/164
[58] Field of Search ............... 126/121, 132, 143, 271, 126/164, 165; 237/8 R, 56, 61, 19

[56] References Cited

U.S. PATENT DOCUMENTS

| | | | |
|---|---|---|---|
| 2,165,661 | 7/1939 | Stenquist | 126/121 |
| 3,926,174 | 12/1975 | Bell | 125/143 |
| 3,958,755 | 5/1976 | Cleer, Jr. | 237/1 A |
| 4,046,320 | 9/1977 | Johnson et al. | 126/132 |

Primary Examiner—John J. Camby
Assistant Examiner—Larry I. Schwartz
Attorney, Agent, or Firm—Cushman, Darby & Cushman

[57] ABSTRACT

A heating system for heating a confined area with an open-hearth wood-burning fireplace. A fireplace jacket is provided which comprises a multi-chambered double-walled arrangement or a grate member. Log supporting portions of the jacket slant upward slightly in order to prevent a pinging sound by creating convectional force when water is circulating therethrough. The grate member includes first and second headers formed from prisms with triangular bases, and water conducting pipe portions extending on three sides of a fire burning in the open-hearth fireplace. The fireplace jacket is readily utilizable with a conventional forced-air furnace in association with a heat exchanger disposed in the furnace cold air return. Combustion air for the fire is provided from an area external of the confined area to be heated by the heating system.

8 Claims, 9 Drawing Figures

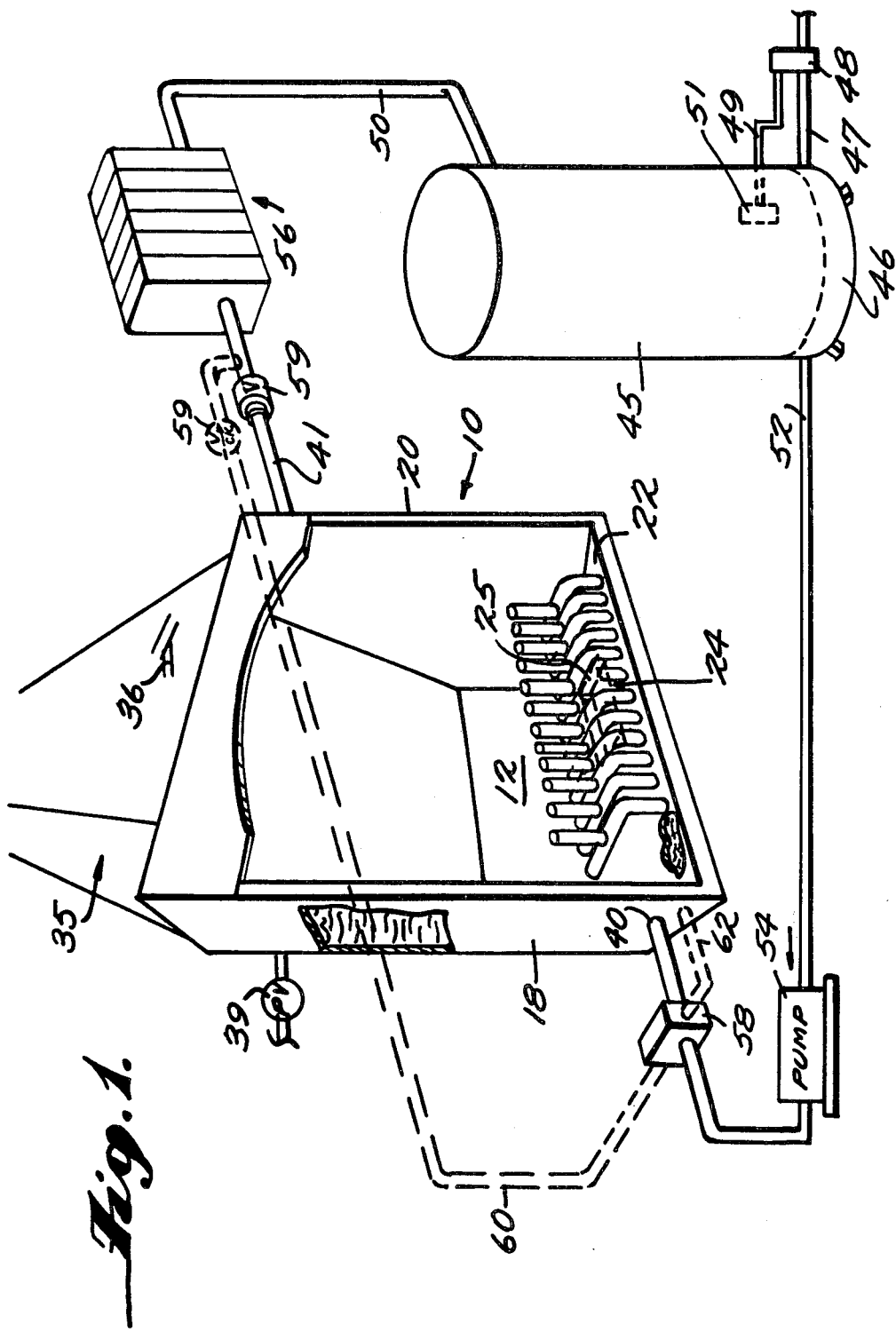

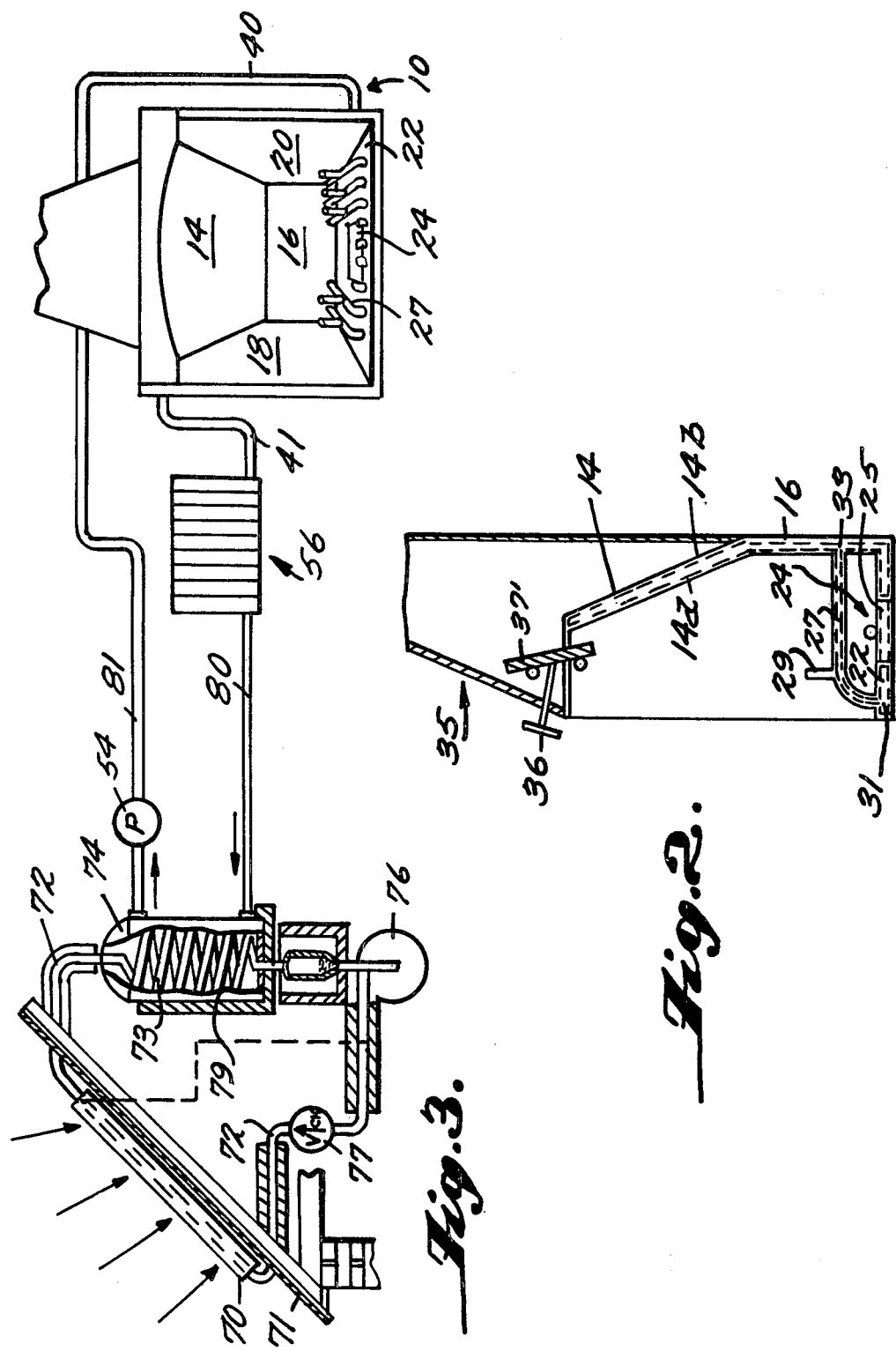

4,131,231

FIREPLACE HEATING SYSTEM

CROSS-REFERENCE TO RELATED APPLICATIONS

This application is a divisional of application Ser. No. 687,631 filed May 18, 1976, now U.S. Pat. No. 4,025,043, which in turn is a continuation-in-part application of U.S. Ser. No. 495,107 filed Aug. 5, 1974, now U.S. Pat. No. 3,958,755 entitled "Hydro-Thermo Fireplace and Heating System Therefor".

BACKGROUND AND SUMMARY OF THE INVENTION

The invention relates to a means for heating a building or for heating hot water for the building comprising in part a means adapted to use the heat from an open wood-burning fireplace. In the past, it has been generally known to use the heat from a fireplace to heat water passed around the open fire — such as shown in U.S. Pat. Nos. 219,978, 670,066, 1,352,371, 1,432,538, and 2,113,896 — however, none of these systems has been useful as an auxiliary in homes with conventional heating or hot-water heating systems, nor have any of these devices provided as great an area for heat transfer as the device of the present invention.

With depletion of our natural resources of oil and natural gas, and with increasingly higher electricity prices it is becoming more and more practical to use wood burned in an open fire as a heat source. In addition to having the potential of meeting a large portion of a home's heating requirements, open wood-burning fireplaces are decorative and often serve as a focal point for family activities. However, it is usually impractical to assume, as have many prior art devices, that wood burned in an open fireplace can provide all the heating or hot-water heating requirements of a home since a fire must be constantly attended to and since large quantities of wood are impractical to store in most homes and locations. However, according to the teachings of the present invention, such a fireplace if hooked up with the conventional heating (including a forced-air system) or forced hot-water heating systems of a home can supply a good deal of auxiliary heat, and can thereby save on utility bills and reduce consumption of difficult to obtain natural resources while providing aesthetic appeal as well.

According to the heating system of the present invention, a water jacket is utilized for circulating water directly around an open-hearth fire. The jacket may comprise a double-walled member having chambers disposed on five sides of the fire and having log-supporting water conducting pipes, or a grate member having water-conducting pipe portions for supporting wood thereon, in each case the wood-supporting members slanting slightly upwardly to create a convectional force so that no pinging sound results from the circulation of water through the wood-supporting members when a fire is burning. Water coming in through an inlet is circulated through the jacket and absorbs heat from the fire burning within the fireplace, and then the hot water by convection rises to the discharge area and passes out a water outlet. The bottom chamber of the multi-water chamber version of the jacket, has an opening formed therein in order to provide combustion air to the fire and increases the heating capability thereof, while additionally reducing materials expense, without interfering with water circulation through the jacket. The opening preferably is connected to the outside of the area to be heated (exterior wall) so that make-up air for the fire is provided from the outside, and not by air preheated by the conventional heating system. A damper may be provided over the combusion air opening for controlling the amount of combustion air that is admitted thereby.

The metal water jacket inlets and outlets are connected up with the conventional pipes of the heating or hot-water heating system of a building, a conventional pump circulating water from the fireplace through the radiators and water storage tank, and interconnecting pipes thereof. A means is provided responsive to the temperature within the hot water storage tank for cutting off the fuel supply (or other means essential to heating of the water by conventional means) when the temperature of water in the tank reaches a certain level due to heating thereof by the fireplace. In addition, means may be provided for cutting out the fireplace from the water circulating system when it is not desired to use the fireplace, or else the fireplace may be left in the system to act as a radiator. The fireplace may be hooked up with solar heating systems, gas burning ones, fuel oil ones, or electric heating systems, and means may be provided for modifying the system to provide forced air heating instead of water heating. For instance, the jacket can communicate with a heat exchanger disposed in the cold air return of a conventional forced air furnace, a circulating pump, expansion tank, and pressure relief valve also being associated therewith. It will be seen that according to the present invention a wood-burning heating system is provided that is in integral operative conjunction with any type of conventional heating system except baseboard electric.

BRIEF DESCRIPTION OF THE DRAWINGS

FIG. 1 is a perspective diagrammatic view of a heating system according to the present invention;

FIG. 2 is a cross-sectional view of the water jacket shown in FIG. 1 taken along lines 2—2;

FIG. 3 is a view of another heating system according to the present invention, showing one portion of the heating system in partial cross-section and a front view of the water jacket;

DETAILED DESCRIPTION OF THE DRAWINGS

Figure 4:
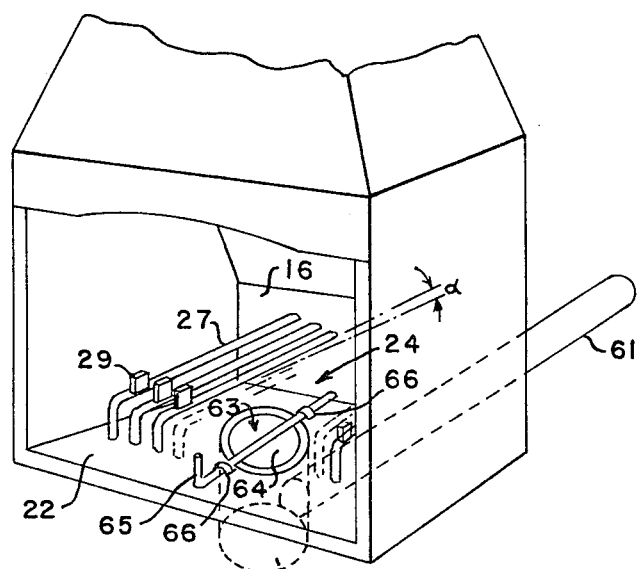
FIG. 4 is a perspective view of another embodiment of the water jacket of FIG. 1, with portions thereof cut away for clarity.

FIG. 1 shows a heating system for a building including a conventional heating system and a jacket 10 for an open-wood-burning fireplace according to the teachings of the present invention. The jacket 10 defines a fireplace 12 in the interior thereof, the fireplace 12 being confined on all sides by the jacket 10 and chimney means 35 associated therewith except for an open front.

The jacket 10 comprises a top portion 14 (see FIGS. 2 and 3 especially), a back portion 16, side portions 18 and 20, and a bottom portion 22. Each of these portions includes spaced metal wall members (i.e., 14a, 14b) defining a water holding chamber therebetween. Although the dimensions may be varied depending upon the total size of the fireplace and building in which it is located, it is preferred that the walls forming each of the chambers 14, 16, 18, 20 and 22 be spaced approximately 1 7/16" apart. Note too that it is preferred that the walls of side chambers 18, 20 slant back so the jacket may be easily fit into an area of a building wall adapted to receive a fireplace. Any wall configuration may be adapted that will increase functional and aesthetic value, or the fireplace 12 may be free standing.

Within the fireplace 12 are disposed a plurality of L-shaped hollow grate members 27. Each member 27 has a solid upstanding rod portion 29 thereof adapted to retain logs on the long leg of the members 27, and each member is connected at 31 to the bottom water chamber 22 and at 33 to the back chamber 16. The members 27 may also be connected to the side chambers 18, 20, if desired. Note that free communication is provided between all the chambers 14, 16, 18, 20 and 22 and the interiors of the grate members 27. As shown in FIG. 4, it is desired that the long legs of the wood-supporting members 27 extend upwardly at a slight angle, rather than just being horizontal. As shown in FIG. 4, the long legs of members 27 make a positive angle $\alpha$ of greater than 0° with the horizontal, preferably $\alpha = 1$–2°. When the long legs of members 27 are horizontal rather than being disposed at a slight positive angle $\alpha$, a "pinging" sound is created when water is flowing through the members 27 with a fire burning in the fireplace 12, which pinging sound can be quite loud at times, and is often objectionable. When the members 27 are arranged as shown in FIG. 4, however, with the long legs thereof disposed at a slight positive angle $\alpha$, this pinging sound is eliminated by increasing convectional flow in the grate members.

Although any suitable heat-conducting material is suitable for forming the structural components of the jacket 10, preferably all the walls of all the chambers will be formed of plate steel, the individual wall portions being welded together at the interfaces thereof. The hollow grate members 27 are preferably made of steel pipe.

Formed in the bottom chamber 22 is an opening 24. The opening 24 is defined by wall portions 25 of the bottom chamber 22, and it provides a combustion air intake. The provision of this combustion air intake 24 increases the efficiency of the burning in the fireplace and thus the heat transfer to the water within the chambers. It is preferred that this combustion air intake 24 is connected to a source of combustion air outside the confined area to be heated by the fireplace 12. The reason for this is that if inside air, previously heated by the conventional heating system for the house or the like in which the fireplace 12 is disposed, is used to support combustion of the fire, the warmed air is passed up the chimney and is wasted, and cold air must be drawn through the windows, doors, and cracks, etc. of the home in order to provide make-up for the air passing up the chimney. Thus, the utilization of a fireplace may actually result in a net heat loss for a home with a conventional heating system when inside air is provided for the combustion air. According to the present invention, when air from an area outside the confined area to be heated by the heating system (i.e., outside) air is utilized this problem is avoided, and a maximum benefit is achieved from the use of the fireplace 12 in conjunction with the conventional heating system. Further, with modern construction methods and materials it is possible to build said confined area in such a manner that is is virtually airtight. Consequently, if no specific provision is made for supplying the fire with combustion air from outside the confined area it is possible that the fireplace would not draft properly, thereby creating a safety hazard.

As shown in FIG. 4, the connection of intake 24 to the outside may be effected merely with a conduit in communication with the intake 24 and extending through the walls of the house or the like in which the fireplace 12 is disposed to the outside. Also, a damper 63 may be provided (see FIG. 4) over the intake 24, the damper including a plate 64 attached to means for adjustably controlling the position of the plate 64, such as control arm 65, the control arm 65 being received by brackets 66 connected to the bottom chamber 22 of the jacket 10 and mounting the arm 65 for pivotal movement about a horizontal axis. The opening 24 additionally can serve as an ash disposal, an ash chute 67 or the like being connected thereto.

Figure 7:
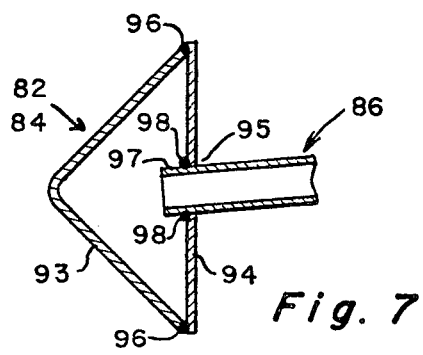
FIG. 7 is a cross-sectional detail view of one of the headers of the grate member of FIGS. 5 and 6.

It will be appreciated that the jacket of the present invention provides for maximum transfer of heat from the fire to the water in the water chambers surrounding the fire since water is circulating on all sides (five) except the open front of the fireplace, and since there is free communication between all of the chambers. Also, since the water inlet 40 is disposed at the bottom of one of the chambers (18 in FIG. 1) and water outlet 41 is disposed at the top of a chamber opposite to the chamber of the water inlet (20 in FIG. 1), water must be significantly heated by moving past the fire on all sides thereof before it is moved up to the outlet by natural convection. Although prior art proposals (see FIGS. 7 and 11 of U.S. Pat. No. 1,352,371 for instance) have suggested that water be circulated within a grate and around several sides of a fire, none of the prior art proposals contemplates an open wood-burning fireplace surrounded on five sides thereof closely adjacent to the fire with free-communicating water conducting chambers and with water circulating through hollow grate portions and with an opening in the bottom chamber for more complete combustion and efficiency, as taught by the present invention.

Located on top of the water jacket 10 is a chimney means 35 which is attached to the top and side chambers (14, 18, 20) of the jacket 10 at various portions thereof and provides for removal of the combustion gases within the fireplace 12. Located within the chimney means 35 is a conventional damper 37 operated by a conventional control handle 36 thereof, which handle extends to the exterior of the chimney means 35 for easy operation thereof. However, the damper control arm may be disposed to the interior opening of the fireplace for more convience in manufacturing and operation.

Figure 5:
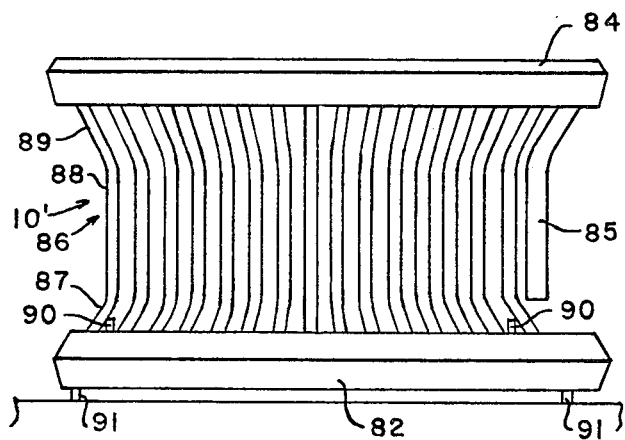
FIG. 5 is a front view of a grate member water jacket according to the present invention.
Figure 6:
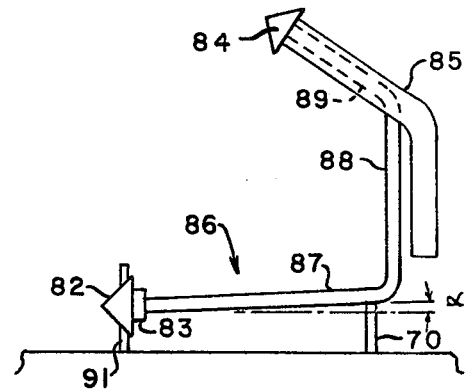
FIG. 6 is a side view of the jacket of FIG. 5.

An alternative from of fireplace jacket for circulating water directly around an open-hearth wood-burning fireplace adapted to have an open fire therein is shown generally at 10' in FIGS. 5 and 6. The jacket 10' includes a grate member having a first header 82 having a liquid inlet 83 connected thereto, a second header 84 having a liquid outlet 85 connected thereto, and a plurality of liquid conducting pipes shown generally at 86, extending between the first header 82 and the second header 84. The inlet 83 may be connected to pipe 52 in the FIG. 1 system, and outlet 85 connected to pipe 41 in the FIG. 1 system. The liquid conducting pipes have wood supporting generally horizontally extending portions 87 extending from the first header 82 toward the second header 84, generally vertically extending portions 88 connected to the wood-supporting portions 87 and forming a back of the jacket 10', and slanting portions 89 connected to the portions 88 and extending vertically and back toward the first header 82, the portions 88 being connected to the second header 84 in liquid communication therewith. Thus liquid is circulated on three sides of the fire. While the wood supporting portions 87 are referred to as "generally" horizontally extending, in fact it is necessary that these portions 87 slant upward slightly (just as do the long legs of members 27, as shown in FIG. 4) in order to eliminate a "pinging" sound by creating a convectional force as the water circulates therethrough with a fire burning in the fireplace. The portions 87 make a positive angle $\alpha$ with respect to the horizontal (see FIG. 6) that is greater than 0° — about 1-2°. Means are provided for supporting the log supporting portions 87 so that they are disposed at the angle $\alpha$, and such means may take the form of a pair of legs 90 spaced from the first header 82 and connected to some of the water conducting pipe portions 87. Small legs 91 can also be provided for supporting the first header 82, of course the relative lengths between the legs 90, 91 being selected so that the small positive angle $\alpha$ for the portions 87 is achieved.

The headers 82, 84 — in order that they may be manufactured in the least expensive way possible — are formed as prisms with generally triangularly shaped bases. As shown most clearly in FIG. 7, a bent plate member 93 formed two legs of the triangular base of the prism, while a straight plate member 94 having a plurality of holes 95 formed therein along the length thereof forms the third leg of the triangular base, the straight plate member 94 being connected to the bent plate member 93 by welds 96 or the like. When formed in this way, the headers 82, 84 may readily be made by a stamping operation and with an automatic tube welder — rather than requiring complex tooling — the straight plate member 94 merely being punched and then connected up to the bent plate member 93, after the liquid conducting pipes 86 (and the inlet 83 or outlet 85) are connected thereto. Each liquid conducting pipe 86 has a free end 97 thereof passed through an opening 95 formed in straight plate member 94, and then the free end 97 is connected by weld 98 on the "inside" of the straight plate member 94 to the member 94. In this way a structurally sound, water-tight, structure is readily constructed in an inexpensive manner from commonly existing materials.

The outlet pipe 41 of the jacket 10 is connected to means for radiating the heat from the water conducted thereby to various rooms in the building in which it is used — such as radiator(s) 56 — and from there is conducted by suitable means such as pipe 50 to a conventional hot-water storage tank 45 of a conventional heating or hot water system. It is understood that instead of radiators 56 a suitable forced air means blowing over hot water conducting coils could be used as the heat transfer means. As shown in FIG. 1, the water tank 45 has a means shown diagrammatically at 46 thereof for heating the water within the tank 45. The means 46 is supplied with fuel or power from a conventional source, such as fuel oil, natural gas, or electricity, through a means 47. A cutoff means 48 is placed within the power or fuel supply 47 and is operatively connected by 49 to a means 51 within the water tank 45 that is responsive to the temperature within the tank 45. When the temperature within the tank is sufficient so that enough heat is being supplied by radiator(s) 56 to the respective areas of the building to be heated — such as when the fireplace 12 has a fire burning therein and water is circulating through the jacket 10 — cutoff means 48 will cutoff the supply of fuel or power to the heater 46 so that it will not operate to further raise the temperature within the tank 45.

Water from storage tank 45 passes through outlet 52 to a conventional pump 54 to be circulated through the jacket 10 and through the system as a whole. The pump 54 provides the motive force for circulating the water throughout the entire heating system (convection of water in the jacket 10 will not be enough to adequately circulate the water throughout the whole system), and may be connected at any suitable location within the heating system. As shown in the drawings, it is connected to the inlet 40 of the jacket 10.

Preferably, water is normally circulating through the jacket 10 (or 10') and the entire heating system at about 12-20 psi. As a safety measure, a pressure relief vent 39 is provided in jacket 10 to prevent too high a build-up of pressure within the jacket 10 which might result in rupturing thereof. Although the welded-steel jacket 10 of the present invention is much more pressure-tight and blowout proof than the cast iron water circulating means of prior art devices, since rupture of the jacket 10 might result in scalding of an individual in the vicinity of the fireplace 12, and since there is no simple means of "turning down" the fire within the fireplace 12 without completely extinguishing it, a pressure relief such as 39 is desirable. The pressure relief 39 is preferably adapted to vent at 30 psi, venting being provided to the exterior of the building or any other suitable place, such as a storage tank, etc.

When it is not desirable to use the fireplace 12 but rather to supply the complete heat or hot water needs of a building with the conventional means 45, 46, a valve 58 may be provided in the inlet 40 for the jacket 10 for cutting off the flow of water therethrough, and simultaneously cutting in a by-pass circulating system 60. In conjunction with this, check valves 59 may be provided in the outlets of the system 60 and the pipe 41 so that water flowing from one system cannot go through the other.

The valve 58 may be operated by an suitable means — for instance, it may be manually operated, or it may be connected through 62 to a temperature responsive means within the jacket 10 which activates the valve 58 when the temperature within the jacket 10 is lower than a certain amount (such as would result when there was no fire burning therein). It is sometimes desirable to cut off the jacket 10 from the circulating system since it contains a large volume of water that must be heated by the means 46; however, since it may also act as a radiator even when a fire is not burning therein, it is not always desirable to employ a cutout such as valve 58 when the fireplace 12 has no fire burning therein. Of course, a supply of make-up water can be provided for the system as a whole or any of the component parts thereof.

In addition to being connected up to a conventional heating or hot water system, the jacket 10 (or 10') according to the present invention could be connected up to any other heating or hot water means, such as a solar heating unit. Any suitable solar heating unit may be so provided as a secondary heating means, such as those shown in U.S. Pat. Nos. 3,390,672, 3,254,703 and 3,254,702. An exemplary suitable solar heating or hot water unit is shown in FIG. 3. This includes a solar collector 70 mounted on a roof 71 of a building, said collector having water-conducting pipes extending therethrough and connected to pipes 72 communicating therewith. The pipes 72 are formed as a coil 73 to increase heat-transfer therefrom within water storage tank 74. Water may be pumped through the system by a pump 76, through a check valve 77 (to keep the water from draining out of the solar collector 70 when the pump 76 is not operating), and the pump 76 is preferably controlled by a means 79 responsive to the water temperature within the tank 74 and/or the solar collector 70. Thus, just as with the FIG. 1 embodiment, when the temperature in tank 74 reaches a certain degree as a result of heating of water by the fireplace 14, the pump 20 will be cut out, and water circulation through the solar collector 70 terminated. Other cut-off means could be provided for the solar system, such as a cut-off valve in pipe 72.

The water jacket 10 is operatively connected to the solar system by pipes 80 and 81 respectively leading into and from the water storage tank 74. Again, conventional pump 54 and radiator(s) 56 are provided as may be suitable means for cutting out the jacket 10 from the water-circulating system if desired.

Figure 8:
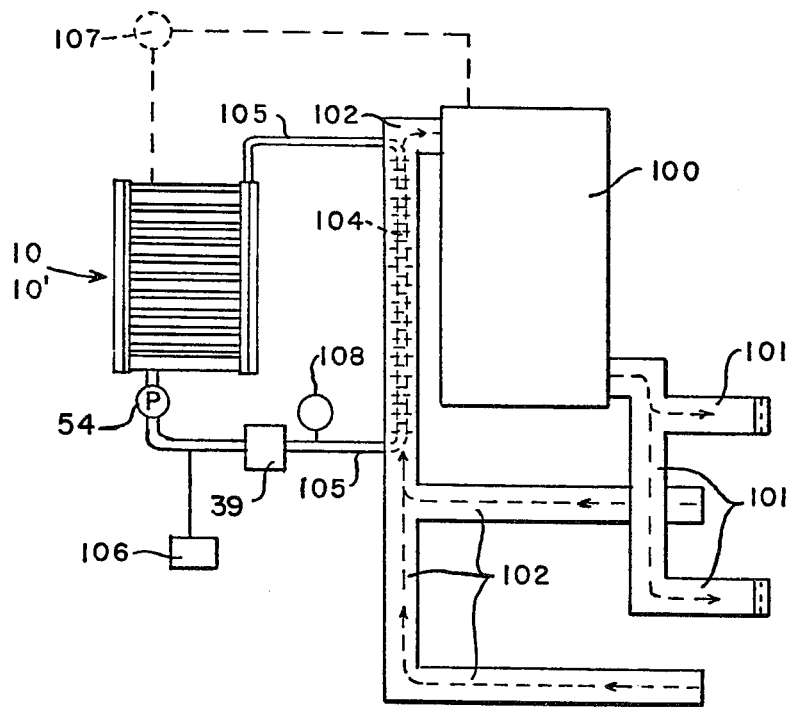
FIG. 8 is a schematic view of a heating system according to the present invention utilizing conventional forced-air ducts.

A heating system according to the present invention may also be provided in a home with a conventional installed forced-air furnace, such as gas or electric forced-air furnaces. This heating system is shown in FIG. 8. The conventional forced-air furnace 100 has hot air ducts 101 extending therefrom, and cold air returns 102 extending thereto. A fireplace jacket 10 or 10' comprising means for circulating water or a like liquid around an open-hearth wood burning fireplace adapted to have an open fire therein is provided, the jacket 10 or 10' including wood supporting water-conducting pipe portions (see 27 in FIG. 4, and 87 in FIG. 6) and means for supporting said wood supporting water conducting pipe portions so that they make a positive angle of greater than 0° with respect to the horizontal (see back 16 in FIG. 4 and legs 90 in FIG. 6). A powered pump 54 is provided and a heat exchanger 104 — which may be of any conventional type — is provided disposed in the cold air return 102. Pipes 105 provide means for operatively connecting the pump 54, fireplace jacket 10 or 10', and heat exchanger 104 in a generally closed loop to circulate liquid through the jacket 10 or 10' to be heated, and then to the heat exchanger 104 to have the heat thereof given up to the air in the cold air return 102. An expansion tank 106 is provided in communication with the pipes 105 in order to allow expansion of the water when heated under pressure to prevent rupturing of the jacket, pipes, or heat exchanger, and additionally a pressure relief valve 39 may be provided for further protection. A thermostatic control means, 60 shown schematically at 107 in FIG. 8, is provided for initiating operation of the furnace 100 when the air temperature in the confined area to be heated is lower than desired and the temperature of the water in the jacket 10, 10' and the closed loop associated therewith is lower than necessary to bring the air temperature up to the required temperature. Normally, the conventional fan of the furnace 100 is always running when the jacket 10, 10' has a fire burning therein even though the heating elements of the furnace 100 need not be activated. Means, such as aquastat 108, may also be provided to operate the blower portion of the furnace automatically upon a temperature rise within the closed loop/fireplace hydronic heating circuit.

Figure 9:
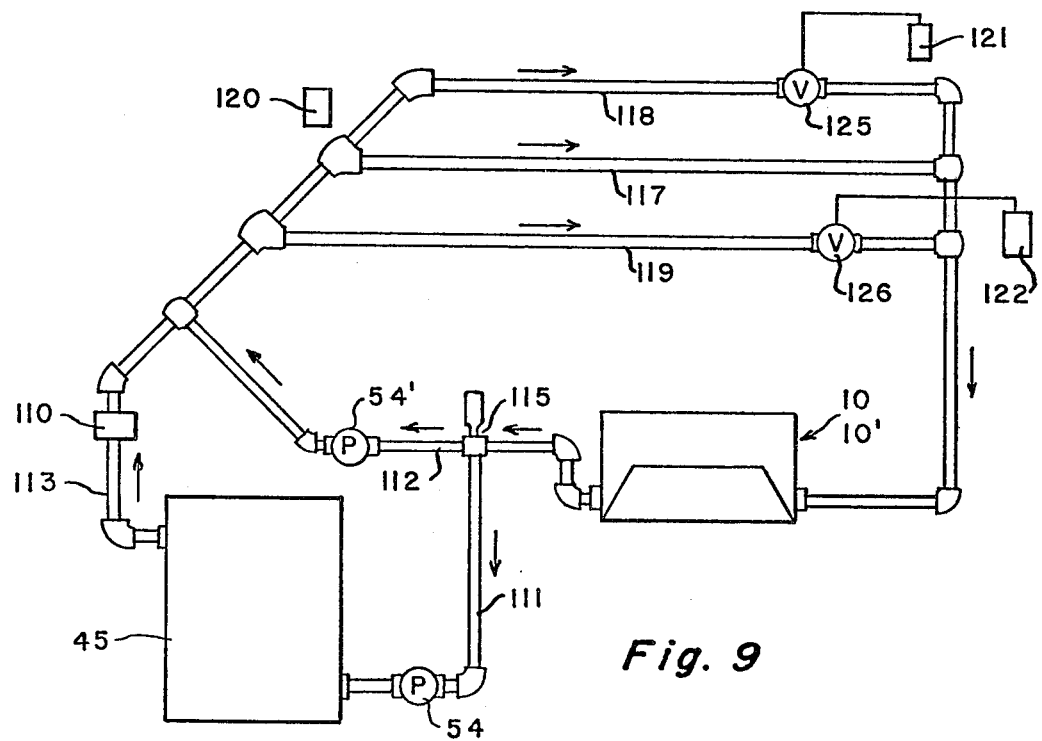
FIG. 9 is a schematic view of a heating system according to the present invention for three-zone control, associated with a domestic hot water supply.

A modification of the system of FIG. 1 is shown in FIG. 9 for use in a system with a forced hot water boiler equipped to also supply domestic hot water, and electric zone control. The hot water boiler 45 is connected up via a pump 54 and a line 111 to the fireplace jacket 10 (or 10'), as in FIG. 1, and a flow control valve 110 is provided. Another line 112 is connected to the line 111 and a line 113 (having the flow control 110 therein), with a pump 54' therein, which pump 54' constantly operates with a fire in jacket 10 or 10' and discharged downstream of the flow control valve 110. A vent 115 is provided in line 111 for conventional air elimination. Excess pressure relief can be provided by P.V. 39 FIG. 1 or by direct fluid communication of jacket 10 or jacket 10', with existing pressure relief facilities of the standard boiler. Three loops (typically) are connected between lines 113 and the jacket 10, 10', a living area loop 117, a second story loop 118, and a basement loop 119, each loop having radiators or the like (not shown) disposed therein. A living area thermostat 120 controls the boiler 45, and water is always circulating through the living area loop 117 when heating is being provided by boiler 45 and/or jacket 10, 10'. Loop 117 will always be designed to have heat radiation capacity in excess of the BTU output of jacket 10 or 10'. A second story thermostat 121 operatively controls a valve 125 disposed in line 118 to selectively allow or prevent the flow of liquid through the loop 118, and a basement thermostat 122 controls a valve 126 disposed in loop 119 to selectively allow or prevent the flow of liquid through the loop 119. No valves or returns are provided in the line 111. The system of FIG. 9 is useful for heating a three story house having a forced hot water boiler equipped to also supply domestic hot water, with an open-hearth wood burning fireplace according to the present invention.

It will thus be seen that an improved water heating means associated with an open wood-burning fireplace and a wood-burning heating means connected to a conventional heating system or hot-water system has been provided.

While the invention has been herein illustrated and described in what is presently conceived to be the most practical and preferred embodiments, it will be obvious to one of ordinary skill in the art that many modifications may be made therefrom within the scope of the invention, which scope is to be limited only by the appended claims.

What is claimed is:

1. A heating system for heating a confined area said system comprising:
 (a) a hot water storage tank,
 (b) means for heating water in said water storage tank,
 (c) a fireplace jacket remote from said means for heating water in said storage tank comprising means for circulating water directly around an open-hearth wood-burning fireplace adapted to have an open fire therein, said fireplace jacket comprising a grate member having a first header and a second header vertically above said first header, a liquid inlet to said first header, and a liquid outlet from said second header, and a plurality of liquid-conducting pipes for supporting logs thereon, said pipes extending between said first header and said second header and in flow communication therebetween and having portions thereof for supporting wood to be burned in said open-hearth wood-burning fireplace thereon, (d) a powered pump, (e) means for transferring the heat of hot water in said storage tank and fireplace jacket to areas remote from but operatively connected to said tank and jacket, and (d) means for providing operative communication between said pump, fireplace jacket, hot water storage tank, and heat transferring means so that water heated by an open fire in said fireplace will be circulated to and from said storage tank by said pump and will be in operative communication with said transfer means whether or not said means for heating water in said storage tank is operating.

2. A heating as recited in claim 1 wherein said fireplace jacket grate member further comprises means for supporting said wood-supporting portions of said liquid conducting pipes so that they make a positive angle of greater than 0° with respect to the horizontal in extending continuously upwardly from said first header to said second header.

3. A heating system as recited claim 2 wherein said liquid conducting pipes have generally horizontally extending log supporting portions extending from said first header, generally vertically extending portions connected to said generally horizontally extending portions and forming a back of said fireplace jacket, and slanted portions connected to said vertically extending portions and extending vertically and back toward said first header, said slanted portions connected to said second header.

4. A heating system as recited in claim 3 wherein said means for supporting said liquid-conducting pipes so that all portions thereof make a positive angle of greater than 0° with respect to the horizontal include leg members spaced from said first header and connected to some of said liquid conducting pipes generally horizontal portions.

5. A heating system as recited in claim 1 wherein each of said headers includes a prism having a triangular base said prism including a bent plate member forming two legs of the triangle and attached to a straight plate member having a plurality of holes formed therein along the length thereof for connection of the header to said liquid-conducting pipes and said inlet or outlet respectively.

6. A heating system as recited in claim 5 wherein said bent plate member is attached to said straight plate member by welds, and wherein said liquid conducting pipes pass through the openings in said straight plate member and are welded to the straight plate member around the openings.

7. A heating system as recited in claim 1 wherein said hot water storage tank also comprises a storage tank for domestic hot water use, said tank being connected by bypass lines to a conduit leading from said fireplace jacket to said means for transferring the heat of hot water to areas remote from said jacket, said powered pump disposed in said conduit and comprising first pump means for pumping water through said conduit, and second pump means for pumping water through said tank being disposed in one of said bypass lines.

8. A heating system as recited in claim 7 further comprising a flow control valve disposed in a bypass line leading from said tank to said conduit, said second pump means being disposed in a bypass line leading from said conduit to said tank.

* * * * *